C. A. MENDENHALL.
WHEEL.
APPLICATION FILED JUNE 26, 1916.

1,295,555.

Patented Feb. 25, 1919.
2 SHEETS—SHEET 1.

Witness
Edwin L. Bradford

Inventor
Charles A. Mendenhall
By Wm E Alype
his Attorney

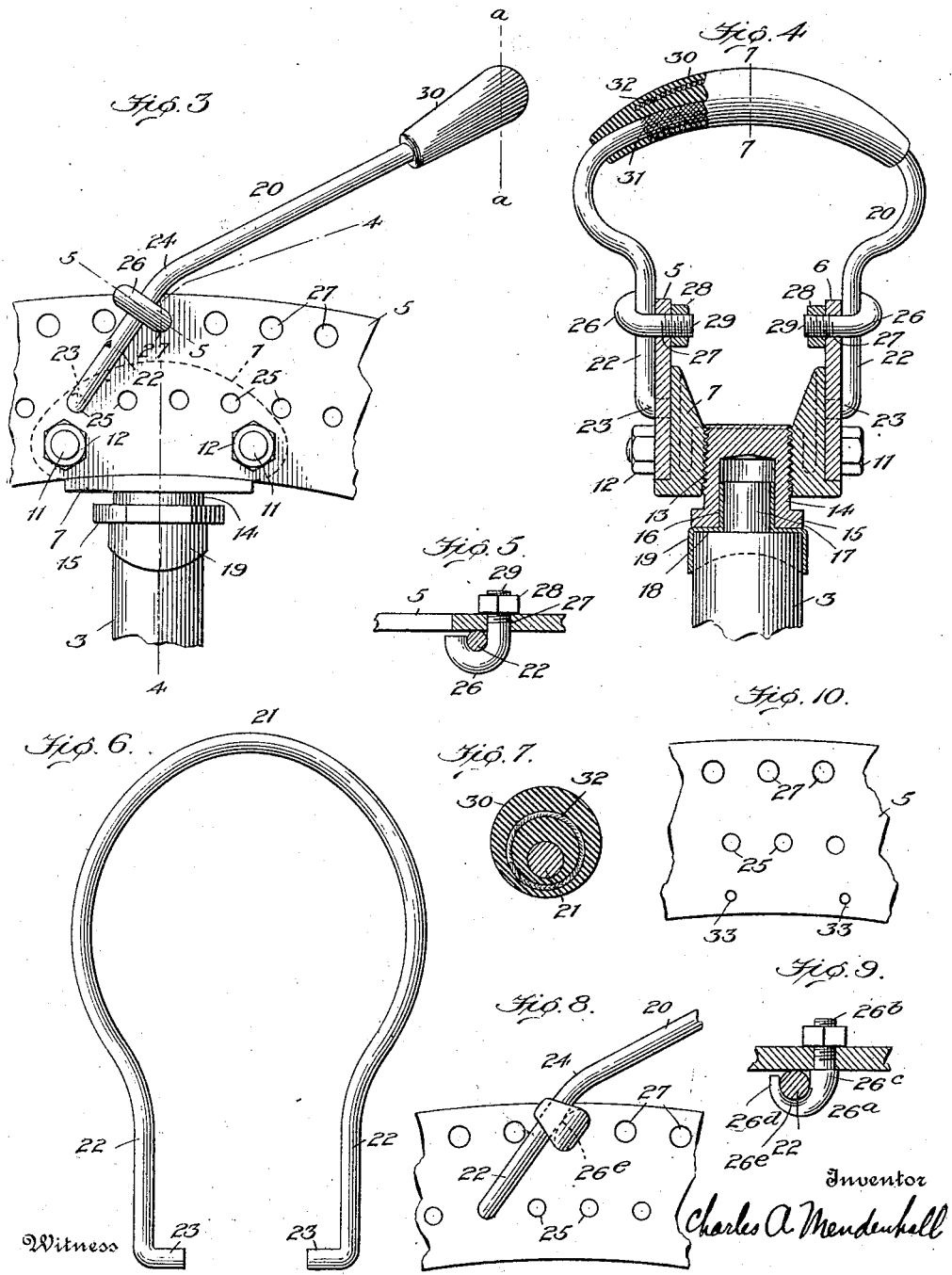

UNITED STATES PATENT OFFICE.

CHARLES A. MENDENHALL, OF FARMLAND, INDIANA.

WHEEL.

1,295,555.   Specification of Letters Patent.   Patented Feb. 25, 1919.

Application filed June 26, 1916. Serial No. 106,047.

*To all whom it may concern:*

Be it known that I, CHARLES A. MENDENHALL, a citizen of the United States, residing at Farmland, in the county of Randolph and State of Indiana, have invented certain new and useful Improvements in Wheels; and I do hereby declare the following to be a full, clear, and exact description of the invention, such as will enable others skilled in the art to which it appertains to make and use the same.

This invention relates to vehicle wheels, and contemplates more especially certain new and useful improvements in that type of wheel set forth in Letters Patent No. 1,120,514, granted to me December 8, 1914.

An object of the present invention is to produce a vehicle wheel in which a maximum resilient efficiency is obtained from circumferentially arranged tread members, tangentially disposed with relation to the rim of the wheel.

Another object of this invention is the production of a wheel comprising a rim formed of two annular spaced rings having parallel outer faces against which the tread members are secured, and rim connecting means including adjustable spoke receiving sockets.

A further object of the present invention is to produce a vehicle wheel composed of resilient tangentially arranged tread members reinforced on their outer curved ends with eccentrically arranged resilient tread surfaces adapted to coöperate with the movement of the tread members on their fulcrum points.

With these and other objects in view the invention further consists in the combination and arrangement of parts hereinafter described and pointed out in the appended claims.

In the drawings which show by way of illustration an embodiment of the invention.

Fig. 3 is a detail side elevation of a portion of the rim, showing the manner in which one of the resilient tread members is secured thereto.

Fig. 4 is a transverse sectional view on the line 4—4 of Fig. 3.

Fig. 5 is a detail sectional view on the line 5—5 of Fig. 3 through one of the hook bolts for securing the tread member in place.

Fig. 6 is a detached view of one of the tread members with the reinforcing resilient tread removed.

Fig. 7 is a sectional view on the line 7—7 of Fig. 4 through the tread member.

Figs. 8 and 9 are views of a modified form of hook bolt for securing the tread member in the rim for wheels of heavy vehicles such as trucks and the like.

Fig. 10 is a view showing a modified form of rim in which wire spokes are used in the wheel.

Figure 1:
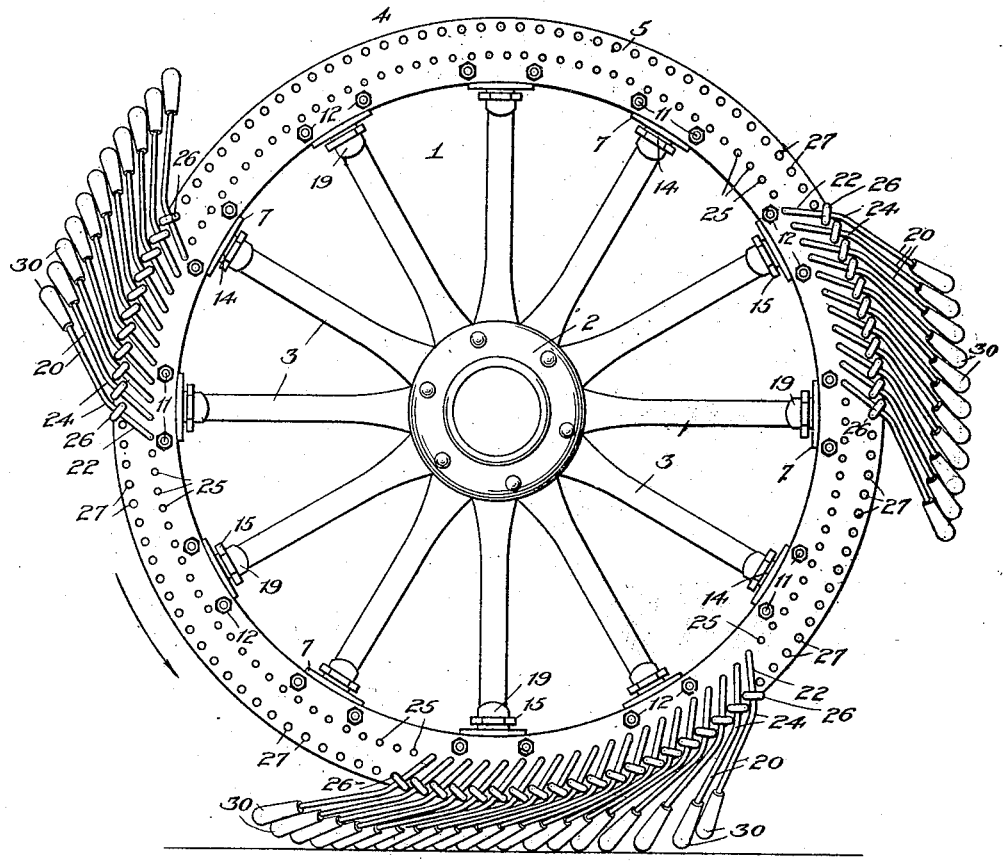
Figure 1 is a side elevation of my improved wheel, illustrating the position of the tread members when contacting with the ground under a load.
Figure 2:
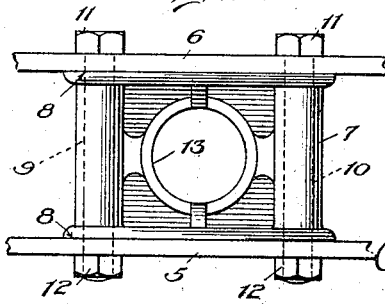
Fig. 2 is a detail plan view of the spaced annular rings forming the rim of the wheel and a rim connector interposed therebetween.

Referring to the drawings, the invention comprises a wheel having a built-up rim to which are secured a plurality of resilient tread members in tangential spring leverage relation, and rim connecting means including adjustable spoke receiving sockets.

The wheel 1 is formed with the usual hub 2 and radially extending spokes 3, to the outer ends of which is connected the rim 4. The rim 4 comprises annular rings 5 and 6 suitably spaced and connected by rim connectors 7 arranged at intervals about the rim at the outer ends of the spokes.

These rim connectors are formed with opposite parallel outer faces 8 adapted to engage similar inner faces of the annular rings 5 and 6.

The rim connectors 7 are interposed between the annular rings 5 and 6, and are provided with openings 9 and 10 at each end thereof, adapted to receive bolts 11 which pass through the annular rings 5 and 6. Suitable nuts 12 are provided on the ends of the said bolts 11, and serve to securely clamp the annular rings 5 and 6 in spaced relation. Each rim connector is further formed with a screw threaded central opening 13 into which is fitted a tenon cup or adjustable spoke receiving socket 14. A flange 15 is provided on the said spoke receiving socket 14, and a socket 16 is also formed therein.

The purpose of this socket 16 is to receive the tenon or reduced end portion 17 of the spoke 3. Fitting around the said tenon 17 and the shoulder 18 formed thereby on the spoke, is a suitable cup-shaped guard 19 the purpose of which is to receive the thrust of the flange 15 and prevent all tendencies of the spoke to split, and insure a snug fit to the tenon 17 of the spoke in the socket 16.

In adjusting the spokes it will be seen that as the flange 15 is gripped and turned the said flange will bear against the shoulder 18 of the spoke, thereby firmly securing the spoke in position between the hub and the rim of the wheel.

From this construction of rim connector and spoke receiving socket it will be seen that a simple, efficient and readily assembled means is provided for building up the wheel, including the rim in a minimum amount of time.

The tangentially arranged tread members 20 are secured to the annular rings 5 and 6. These tread members are formed with an outer curved tread portion 21, and oppositely disposed parallel arms 22, the ends 23 of which are bent at substantially right angles thereto as clearly shown in Fig. 6 of the drawings.

The parallel arms 22 are also bent at an angle as at 24 out of the tangential alinement of the curved outer tread portion of the tread members, as shown in Figs. 1 and 3 of the drawings. In securing the tread members to the annular rings 5 and 6, the right-angularly disposed ends 23 are sprung into openings 25 arranged in opposite pairs around the said rings 5 and 6. Hook bolts 26 are now fitted over each parallel arm 22 of the tread members, just beneath the angular portion 24 thereof, and extend through openings 27 formed in opposite annular relation in the rings 5 and 6. Nuts 28 are secured to the threaded shanks 29 of the said hook bolts and firmly secure the parallel arms 22 of the tread members against the outer parallel faces of the annular rings 5 and 6. The arms 22 of the tread members bear on the curved portions of the shanks of the said hook bolts and operate as levers, with the said hook bolts as the fulcrum point, when the wheel is turned and the tread members contact with the ground. The material of which these tread members are composed is such that a substantial flex thereof on the fulcrum points can be obtained, when the load is applied as they meet the ground, and also be subsequently returned to their normal position when the load is removed as the tread members leave the ground.

As a result of this leverage a pulling action is transmitted to the wheel, which, together with the eccentrically arranged reinforcing tread surfaces now to be described, produce a combined resilient and tractive result which has proven highly efficient.

The reinforcing tread sleeves 30 are eccentrically secured to the outer portions 21 of the tread members, (see Figs. 3, 4 and 7).

They consist of resilient material such as rubber or the like formed about a roughened or knurled portion 31 of the outer curved portions of the tread members, the tread contacting surface thereof forming the principal diameter of the eccentrically arranged portion, and being substantially perpendicularly disposed to the path of travel of the wheel, and angularly disposed with relation to the tangential alinement of the tread members connected to the rim, as indicated by the line $a$—$a$ in Fig. 3.

A breaker strip 32 is preferably provided in the said reinforcing tread sleeves as shown and assists in the wear thereof.

From this construction it will be seen that the load and tractive action of the wheel is transmitted through the largest wearing portion of the eccentrically arranged tread sleeves. This construction increases the life of each tread sleeve and the relative resiliency of the wheel.

While I have shown a circular form of resilient tread reinforcing element, it will be understood that various other cross sectional forms can be substituted, and I do not limit myself to the exact form shown herein.

Referring to Figs. 8 and 9 of the drawings, I have shown a modified form of hook bolt $26^a$ in which the shank $26^b$ extends from an enlarged portion $26^c$ forming a shoulder designed to bear against the outer face of the annular ring.

The enlarged portion $26^c$ may be of substantially elliptical or other formation and tapers to the engaging lip $26^d$ as shown. A curved bearing surface $26^e$ is provided in said hook bolt so as to afford easy movement to the arm 22 of the tread members as it fulcrums thereon. This design of hook bolt is adapted for use in heavier wheels used on trucks and the like.

In the modified form of rim shown in Fig. 10 of the drawings, I provide in addition to the annularly disposed openings 25 and 27 an annular row of openings 33 arranged to receive the ends of wire spokes should the form of wheel desired be of this type.

From the foregoing it will be obvious that an efficient and economically constructed wheel has been produced, having all of the advantages of the usual pneumatic tire as applied to a wheel, and at the same time overcoming many of the disadvantages incident thereto.

While I have described and illustrated an embodiment of my invention it will be understood that various changes in form, proportion and minor details of construction may be resorted to without departing from the scope of my invention as set forth in the appended claims.

Having thus described my invention what I claim and desire to secure by Letters Patent is:

1. In a resilient wheel the combination with oppositely disposed annular rim members each having two series of openings therein, of a tread surface comprising tread members each having an outer bearing surface and inwardly extending arms the ends of which are secured in one of the aforesaid series of openings, and fulcrum devices provided near the ends of the inwardly extending arms of said tread members and retained within the other series of openings for securing the tread members upon the annular rim members.

2. In a resilient wheel the combination with oppositely disposed annular rim members each having two series of openings therein, of a tread surface comprising tread members each having an outer bearing surface and inwardly extending arms the ends of which are secured in one of the aforesaid series of openings, and fulcrum devices including U-shaped hook bolts provided near the ends of the inwardly extending arms of said tread members and retained within the other series of openings for securing the tread members upon the annular rim members.

3. In a resilient wheel the combination with oppositely disposed annular rim members each having two series of annularly arranged openings therein, of a tread surface comprising tread members each having an outer bearing surface and inwardly extending arms, the ends of which are bent and secured in one of the series of openings, and fulcrum retaining devices provided near the ends of said inwardly extending arms and secured in the other series of openings for yieldingly securing the tread members upon the annular rim members.

In testimony whereof I affix my signature, in presence of two subscribing witnesses.

CHARLES A. MENDENHALL,

Witnesses:
ARTHUR L. BRYANT,
W. C. CLEVENGER.

Copies of this patent may be obtained for five cents each, by addressing the "Commissioner of Patents, Washington, D. C."